United States Patent [19]
Koike

[11] Patent Number: 5,243,445
[45] Date of Patent: Sep. 7, 1993

[54] PICTURE PROCESSING APPARATUS

[75] Inventor: Kazumasa Koike, Atsugi, Japan

[73] Assignee: Ricoh Company, Ltd., Tokyo, Japan

[21] Appl. No.: 721,293

[22] Filed: Jun. 26, 1991

[30] Foreign Application Priority Data

Jun. 27, 1990 [JP] Japan .................. 2-168781

[51] Int. Cl.$^5$ .................. H04N 1/40
[52] U.S. Cl. .................. 358/462; 358/460; 358/461; 358/465; 358/466; 358/467
[58] Field of Search .................. 358/443, 445, 447, 448, 358/450, 452, 455, 456, 457, 458, 459, 460, 461, 462, 464, 465, 466, 467, 470; 382/50, 51, 52, 53

[56] References Cited

U.S. PATENT DOCUMENTS

| | | | |
|---|---|---|---|
| 4,554,593 | 11/1985 | Fox et al. | 358/464 |
| 4,668,995 | 5/1987 | Chen et al. | 358/459 |
| 4,856,075 | 8/1989 | Smith | 358/443 |
| 5,121,447 | 6/1992 | Tanioka et al. | 358/464 |

FOREIGN PATENT DOCUMENTS 169174 7/1988 Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A picture processing apparatus with a texture elimination capability which is applied to a facsimile. The apparatus includes an input image sensor for inputting an analog signal by scanning a document containing a character region and a graphic region, an analog-to-digital converter for converting the analog signal into multilevel digital data, a region segmentation part for determining whether each data of the multilevel digital data is included in the graphic region, a binary coding part for binary coding the multilevel digital data through an error diffusion process and for supplying the binary-coded data to an output part, and a weighting part for assigning weights to the multilevel digital data at given intervals therebetween when the multilevel digital data is determined as being included in the graphic region and for supplying the weighted multilevel digital data to the binary coding part, so that the weighted multilevel digital data are binary-coded through an error diffusion process and undesired texture is eliminated.

8 Claims, 4 Drawing Sheets

FIG.3

| -1 | 0 | 0 | -1 |
|----|---|---|----|
| 0  | 1 | 1 | 0  |
| 0  | 1 | 1 | 0  |
| -1 | 0 | 0 | -1 |

FIG.5

| 9 | 8 | 8 | 9 |
|---|---|---|---|
| 8 | 7 | 7 | 8 |
| 8 | 7 | 7 | 8 |
| 9 | 8 | 8 | 9 |

PICTURE PROCESSING APPARATUS

BACKGROUND OF THE INVENTION

The present invention relates to picture processing apparatus, and more particularly to a picture processing apparatus with texture elimination capability in a facsimile, which facilitates reproduction of a high quality picture from a document containing a character region and a continuous/screened graphic region.

Conventionally, some picture processing methods have been proposed which reproduce high quality, precise images from original images by a picture processing apparatus in a facsimile. For example, Japanese Laid-Open Patent Application No. 63-169174 discloses a conventional picture processing method in which it is determined whether each of a set of image data from a document is included in a non-edge portion of the the document or in an edge portion thereof. When the image data are determined as being included in a non-edge portion of the original image, weights are periodically applied to the image data and then a binary coding is performed by using a so-called error diffusion method.

This conventional picture processing method described above is achieved by a picture processing apparatus which is constructed as shown in FIG. 1. The picture processing apparatus as shown in FIG. 1 generally has an image sensor part 21, an A/D converter 22, a correction circuit 23, an edge detection circuit 25, a multilevel dither matrix circuit 24, a binarization circuit 26 and a printer 27. The image sensor part 21 scans a document to input image signals indicative of picture elements, or pixels, in the document being scanned. The A/D converter 22 converts each of the image signals into a digital data, and the correction circuit 23 corrects the digital data from the A/D converter 22 to eliminate image defects related to the sensitivity of image data supplied by the image sensor part 21. The edge detection circuit 24 determines whether each image data is located in an edge portion of the original images or in a non-edge portion thereof. The multilevel dither matrix circuit 24 serves to perform conversion or quantization of the image data. The multilevel dither matrix circuit 24 uses, for example, seven 3×3 dither matrixes to convert 8-bit data into 3-bit data. The binarization circuit 26 binarizes the image data from the correction circuit 23 through the error diffusion method. The printer 27 outputs the image data from the binarization circuit 26. When image data is detected by the edge detection circuit 25 as being included in a non-edge portion of the original image, the image data is supplied from the multilevel dither matrix circuit 24 to the binarization circuit 26, so that the image data is binary-coded through the error diffusion process. With some dither matrixes of a concentrated dot type in the multilevel dither matrix circuit 24 being used, the picture processing apparatus can form pseudo screened dots from the image data when the binarization circuit 26 performs binary coding of the image data through the error diffusion method. Advantageous features of the above mentioned picture processing apparatus using dither matrixes of a concentrated dot type are that weights given to image data to which data in the midst of the dither matrix are applied are greater than weights given to image data to which data in the circumference of the dither matrix are applied, and undesired stripe patterns or noise-causing spots may be reduced in reproduced images.

However, the above conventional apparatus is not able to reproduce a high quality, precise image for the whole of a character of an original document when image data from the original document are binary-coded through the error diffusion method. The conventional apparatus can merely prevent the reproduced images of edge portions of characters from deteriorating. For example, the edge detection circuit may determine erroneoutly that image data corresponding to the central part of a boldface line in a character is included in a non-edge portion of the character, and weights are assigned to such image data, thus the reproduced image of the character becoming unclear or being of poor quality after such image data is binarized through the error diffusion method.

In addition, in the present invention, some improved picture processing methods for eliminating undesired texture from reproduced images are disclosed, the undesired texture appearing due to the error diffusion method being used. In one of the improved methods, weights are periodically applied to image data at regular intervals therebetween. In another improved method, threshold values used for binary coding of multilevel digital data through the error diffusion process performed by the binarization circuit are varied periodically.

SUMMARY OF THE INVENTION

Accordingly, it is a general object of the present invention to provide an improved picture processing apparatus in which the above described problems of the conventional apparatus are eliminated.

Another and more specific object of the present invention is to provide a picture processing apparatus with texture elimination capability which facilitates reproduction of high quality binary-coded picture a document containing a character region and a screened/continuous graphic region by scanning such a document. The above mentioned object of the present invention can be achieved by a picture processing apparatus which comprises an input part for inputting an analog signal from a document containing a character region and a graphic region, an analog-to-digital converter for converting the analog signal from the document into a set of multilevel digital image data, a segmentation part for determining whether each data of the set of multilevel digital image data is included in the graphic region of the document or not, a binary coding part for performing binary coding of the multilevel digital image data through an error diffusion process and for supplying binary-coded image data to an output part, and a weighting part for assigning weights to the multilevel digital image data at given intervals therebetween when the multilevel digital image data is determined as being included in the graphic region of the document and for supplying the weighted multilevel digital image data to the binary coding part, thereby the binary coding part performing binary coding of the multilevel digital image data through an error diffusion process. According to the present invention, when the document contains a graphic region and a character region, the image processes for these different regions are performed separately from each other. The binarization of image data for the character region is carried out through an error diffusion process by applying no weights to the multilevel digital image data or by using a fixed threshold value, so that the details of character images in the midst thereof do not disappear, allowing high quality, precise images to be reproduced for the character region. The binarization of image data for the graphic region is carried out through an error diffusion process by applying weights to the multilevel digital image data at given intervals therebetween or using periodically varied threshold values, so that reproduced images become clear, as no texture appears due to the error diffusion technique being used.

Other objects and further features of the present invention will be more apparent from the following detailed description when read in conjunction with the accompanying drawings.

BRIEF DESCRIPTION OF THE DRAWINGS

FIG. 3 is a diagram showing an example of superimposed data which is stored in a memory part of the picture processing apparatus shown in FIG. 2;

FIG. 5 is a diagram showing an example of superimposed data which is stored in a memory part of the picture processing apparatus shown in FIG. 4.

DESCRIPTION OF THE PREFERRED EMBODIMENTS

Figure 1:
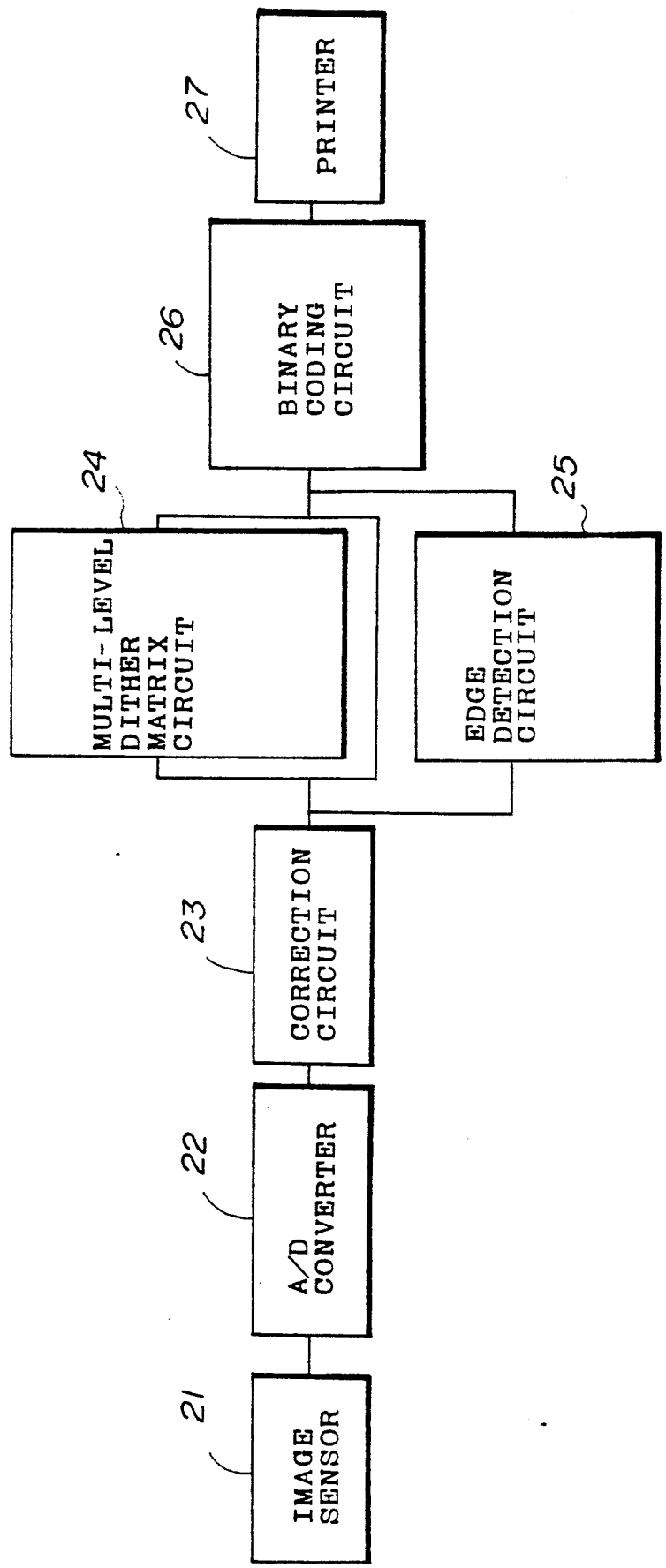
FIG. 1 is a block diagram showing a construction of a conventional picture processing apparatus.

First, a description will be given of an embodiment of a picture processing apparatus according to the present invention, with reference to FIGS. 2 and 3. In FIG. 3 there is shown a first embodiment of the picture processing apparatus of the present invention. This picture processing apparatus generally has an input part 11, an A/D (analog-to-digital) converter 12, a region segmentation part 13, a superimposing part 14, a memory part 15, a vertical counter 16, a horizontal counter 17, an error diffusion part 18, and an output part 19. The input part may be, for example, a line image sensor including a number of CCDs (charged couple devices) which supplies an analog signal, generated by the CCDs through photoelectric conversion of each image signal from an original document, to the A/D converter 12. The A/D converter 12 converts the analog signal from the input part 11 into a multilevel digital signal. The region segmentation part 13 determines whether each pixel, corresponding to each digital signal from the A/D converter 12, is included in a graphic region or in a character region of the document, and supplies a signal, indicative of the determination made by the region segmentation part 13, to the superimposing part 14 for each pixel from the original document. The superimposing part 14 calls out superimposing data from the memory part 15 and adds the superimposing data from the memory part 15 to a concentration assigned to a pixel being considered, only when the region segmentation part 13 determines that the pixel being considered is included in a graphic region of the original document. A set of superimposing data, as shown in FIG. 3, are stored in the memory part 15. The vertical counter 16 is a counter which determines a coordinate value of the pixel being considered which is counted in a main scanning direction of the input part 11 in which the original document is scanned by the line image sensor. This coordinate value is a value which is expressed in space coordinates. Also, the horizontal counter 17 is a counter which determines a coordinate value of the pixel being considered which is counted in a sub scanning direction of the input part 11 perpendicular to the main scanning direction, this sub scanning being performed by transporting the original document in a direction perpendicular to the main scanning direction. This coordinate value is a value which is expressed in space coordinates. The error diffusion part 18 performs a so-called error diffusion process for binary coding of a multilevel digital image data being weighted with the superimposing data by the superimposing part 14. The output part 19 may be a printer which outputs binary-coded image data onto a recording sheet.

Figure 2:
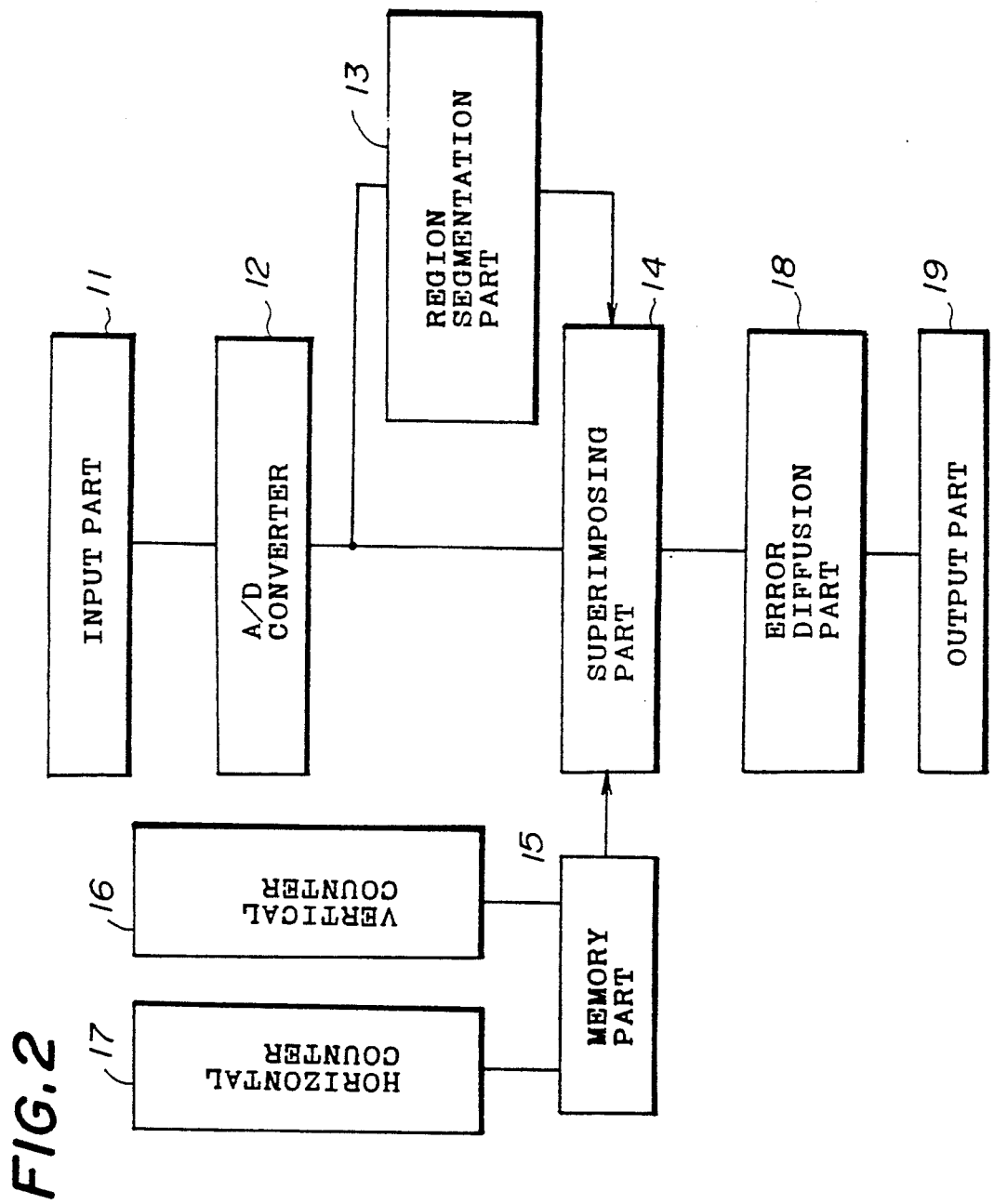
FIG. 2 is a block diagram showing a construction of an embodiment of a picture processing apparatus according to the present invention.

In the embodiment of the picture processing apparatus shown in FIG. 2, the region segmentation part 13 discriminates between a graphic region and a character region of an original document, and, only when the pixel being considered is included in a graphic region thereof, weights of the superimposing data from the memory part 15 are periodically applied to the pixels being considered. The superimposing data when the pixel is included in a graphic region thereof is called out from the memory part 15, in accordance with the coordinate values of the pixel which are counted by the vertical counter 16 and by the horizontal counter 17. The superimposing part 14 adds the superimposing data thus called out to the concentration of the pixel being considered. On the other hand, when the region segmentation part 13 determines that a pixel being considered is included in a character region of the original document, no superimposing is performed by the superimposing part 14 with respect to the pixel.

A set of superimposing data, as shown in FIG. 3, are stored in the memory part 18. As described above, the superimposing data when the pixels are included in a graphic region of the original document is called out by the superimposing part 14 from the memory part 15, in accordance with the coordinate values of the pixels which are counted by the vertical counter 16 in a main scanning direction and by the horizontal counter 17 in a sub scanning direction. Thus, the superimposing data being added to the concentration bits of the pixels are varied at given intervals between the pixels included in the image.

Next, another embodiment of the picture processing apparatus according to the present invention will be described, with reference to FIGS. 4 and 5. In FIG. 5 there is shown a second embodiment of the present invention, and those parts of this picture processing apparatus which are the same as those corresponding parts of the apparatus shown in FIG. 2 are designated by the same reference numerals.

Figure 4:
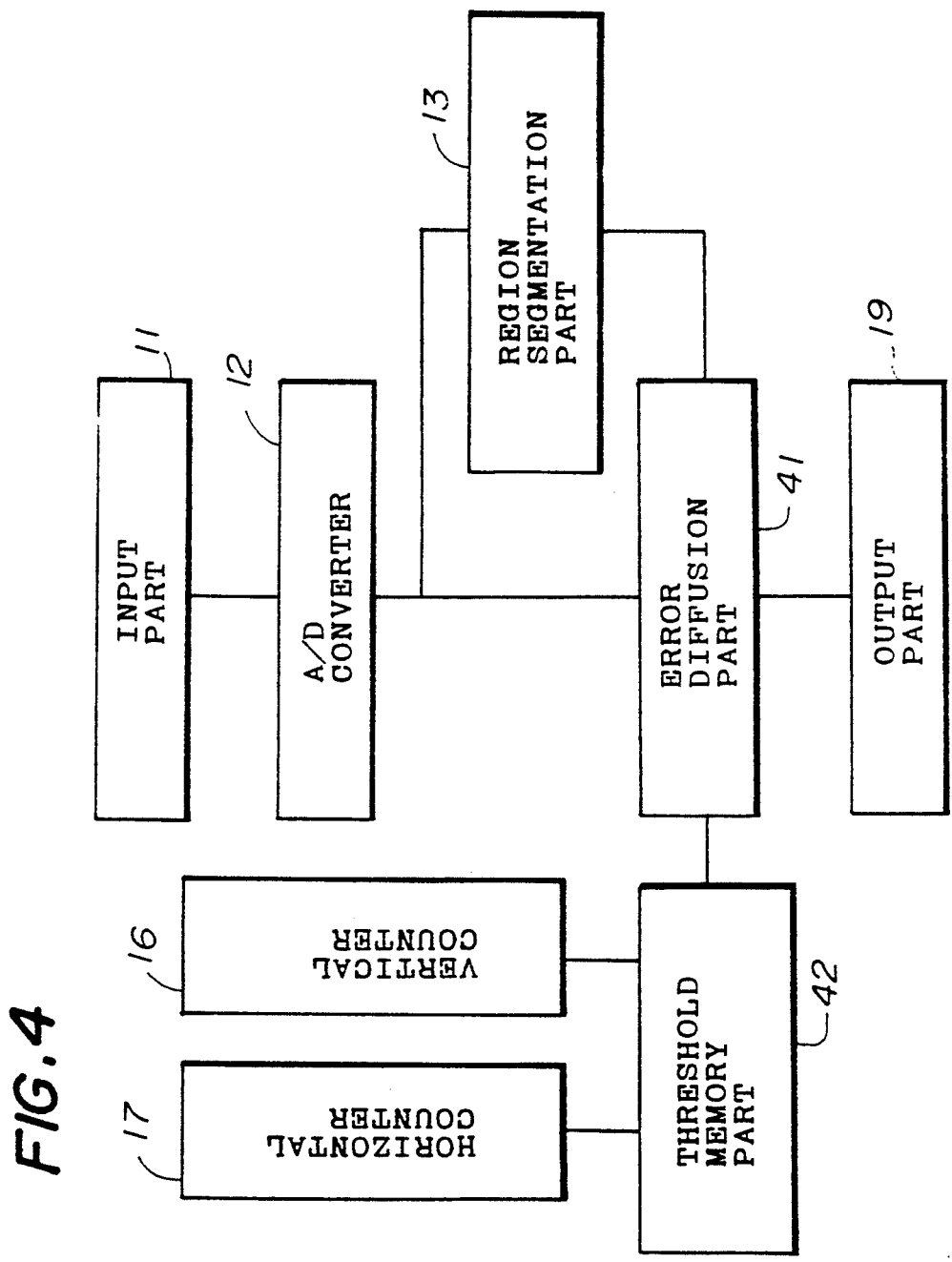
FIG. 4 is a block diagram showing a construction of another embodiment of the picture processing apparatus of the present invention.

The picture processing apparatus as shown in FIG. 4 includes an error diffusion part 41 and a threshold memory 42. The error diffusion part 41 performs binary coding of the multilevel digital data from the A/D converter 12 by performing the error diffusion process by comparing the data with threshold values which are stored in the threshold memory 42. In the present embodiment, a set of threshold values are stored in the threshold memory 42. For example, in a case where 4 bits are assigned to each multilevel digital data (and sixteen gray levels 0 through 15 assigned to each multilevel digital data are described by these 4 bits for each multilevel digital data), a matrix of threshold values as shown in FIG. 5 are stored in the threshold memory 42.

Similar to the first embodiment of the present invention as shown in FIG. 2, the picture processing apparatus shown in FIG. 4 has the A/D converter 12 which converts the analog signal from the input part 11 into a multilevel digital signal. The region segmentation part 13 determines whether each pixel corresponding to each multilevel digital signal from the A/D converter 12 is included in a graphic region or in a character region of the document, and supplies a signal, indicative of the determination made by the region segmentation part 13, for each pixel from the document, to the error diffusion part 41. When the region segmentation part 13 determines that a pixel being considered is included in a graphic region, the error diffusion part 41 calls out a set of threshold values from the threshold memory 42, and performs binary coding of the multilevel digital data from the A/D converter 12 by performing the error diffusion process by comparing the data with the threshold values thus called out. The vertical counter 16 determines a coordinate value of the pixel being considered which is counted in the main scanning direction of the input part 11. This coordinate value is a value which is expressed in space coordinates. Also, the horizontal counter 17 determines a coordinate value of the pixel being considered which is counted in the sub scanning direction of the input part 11. This coordinate value is a value which is expressed in space coordinates. The output part 19 outputs a set of binary-coded image data from the error diffusion part 41 onto a recording sheet.

The set of threshold values when the pixel being considered is included in a graphic region of an original document are called out from the threshold memory 42, in accordance with the coordinate values of the pixels which are counted by the vertical counter 16 and by the horizontal counter 17. These threshold values which are used when the binary coding of the multilevel digital image data is performed through the error diffusion process by the error diffusion part 41 are also varied at regular intervals of pixels included in the original document.

As described above, according to the present invention, when picture processing is performed for a graphic region included in a document, undesired texture can be effectively eliminated from a reproduced image of the document and a high quality, precise image can be reproduced. The binary coding of image data in the graphic region is performed through an error diffusion process by applying weights to the image data at given intervals therebetween or by using periodically varied threshold values. When picture processing is performed for the character region of the document, the details of character images in the midst thereof do not disappear and the reproduced images become clear. The binary coding is performed through an error diffusion process by applying no weights or using a fixed threshold value; thus allowing high quality, precise images to be reproduced from the document containing a character region and a graphic region.

Further, the present invention is not limited to the above described embodiments, and variations and modifications may be made without departing from the scope of the present invention.

What is claimed is:

1. A picture processing apparatus with a texture elimination part, comprising:

input means for inputting an analog signal by scanning a document containing a character region and a graphic region;

conversion means for converting said analog signal inputted by said input means into multilevel digital image data;

determining means for determining whether each of said multilevel digital image data is included in the graphic region of the document or not;

binary coding means for performing binary coding of said multilevel digital image data through an error diffusion process and for supplying binary-coded image data to an output part; and weighting means for assigning weights to said multilevel digital image data at given intervals therebetween when said multilevel digital image data is determined as being included in the graphic region of the document and for supplying said weighted multilevel digital image data to said binary coding means, thereby said binary coding means performing binary coding of said multilevel digital image data through an error diffusion process.

2. The apparatus as claimed in claim 1, wherein said weighting means includes a pair of counters for determining coordinate values of the multilevel digital image data and a memory part in which a set of weights to be assigned to the multilevel digital image data are stored.

3. The apparatus as claimed in claim 1, wherein said weighting means assigns no weight to the multilevel digital image data when said multilevel digital image data is determined as being included in the character region of the document.

4. The apparatus as claimed in claim 1, further comprising a memory part in which a set of weights to be assigned to the multilevel digital image data are stored, said weights assigned by said weighting means to said multilevel digital image data being called out by said weighting means from said memory part in accordance with coordinate values of said multilevel digital image data.

5. A picture processing apparatus comprising:

input means for inputting an analog signal by scanning a document containing a character region and a graphic region;

conversion means for converting the analog signal from the document into a set of multilevel digital image data;

determining means for determining whether each data of said set of multilevel digital image data is included in the graphic region of the document or not;

binary coding means for performing binary coding of said multilevel digital image data by comparing the data with a threshold value through an error diffusion process and for supplying binary-coded image data to an output part; and means for varying said threshold value at given intervals between said multilevel digital image data when said the multilevel digital image data is determined as being included in the graphic region of the document, and for supplying said varied threshold value to said binary coding means, so that said multilevel digital image data is binary-coded by comparing the data with said threshold value.

6. The apparatus as claimed in claim 5, wherein said threshold varying means does not vary said threshold value when said multilevel digital image data is determined as being included in the character region of the document, and said threshold value not being varied when it is compared with the multilevel digital image data included in the character region of the document.

7. The apparatus as claimed in claim 5, further comprising a memory part in which a set of threshold values used for said binary coding are stored, said threshold value to be compared with said multilevel digital image data being called out by said threshold varying means from said memory part in accordance with coordinate values of said multilevel digital image data.

8. The apparatus according to claim 5, wherein said threshold varying means includes a pair of counters for determining coordinates of the multilevel digital image data and a memory part in which a set of threshold values are stored, said threshold varying means calling out a threshold value from said memory part in accordance with coordinate values of said multilevel digital image data, said coordinate values being counted by said counters.

* * * * *